United States Patent
Suzuki

(10) Patent No.: US 7,990,615 B2
(45) Date of Patent: *Aug. 2, 2011

(54) DIFFRACTIVE OPTICAL SYSTEM AND EYEPIECE OPTICAL SYSTEM

(75) Inventor: Kenzaburo Suzuki, Yokohama (JP)

(73) Assignee: Nikon Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/689,948

(22) Filed: Jan. 19, 2010

(65) Prior Publication Data

US 2010/0182697 A1    Jul. 22, 2010

Related U.S. Application Data

(63) Continuation of application No. PCT/JP2008/062612, filed on Jul. 11, 2008.

(30) Foreign Application Priority Data

Jul. 20, 2007   (JP) .................................. 2007-188905

(51) Int. Cl.
*G02B 5/18* (2006.01)

(52) U.S. Cl. ....................................... 359/569; 359/570
(58) Field of Classification Search .................. 359/558, 359/569, 570

See application file for complete search history.

(56) References Cited

U.S. PATENT DOCUMENTS

| 5,623,365 A * | 4/1997 | Kuba .............................. 359/569 |
| 5,764,418 A | 6/1998 | Sato et al. |
| 2001/0036019 A1 | 11/2001 | Fukumoto |
| 2005/0014088 A1 * | 1/2005 | Nakamura et al. ......... 430/270.1 |
| 2006/0285229 A1 * | 12/2006 | Ogawa ........................... 359/754 |

FOREIGN PATENT DOCUMENTS

| JP | 9-5647 | 1/1997 |
| JP | 2001-281560 A | 10/2001 |
| JP | 2004-126393 | 4/2004 |
| JP | 2004-126393 A | 4/2004 |
| JP | 2004-126395 | 4/2004 |
| JP | 2004-126395 A | 4/2004 |
| JP | 2004-126472 | 4/2004 |
| JP | 2004-126472 A | 4/2004 |

* cited by examiner

*Primary Examiner* — Joshua L Pritchett
(74) *Attorney, Agent, or Firm* — Miles & Stockbridge P.C.

(57) ABSTRACT

A diffractive optical system including a diffractive optical element is provided with a first lens component having a first positive lens, and a second lens component having a second positive lens and a negative lens. The diffractive optical element has a first diffractive optical member having a first diffractive optical surface, and a second diffractive optical member having a second diffractive optical surface. The first diffractive optical member and the second diffractive optical member are arranged so that the first diffractive optical surface and the second diffractive optical surface are in contact with each other. A refractive index of the first diffractive optical member and a refractive index of the second diffractive optical member at the d line are different from each other.

11 Claims, 7 Drawing Sheets

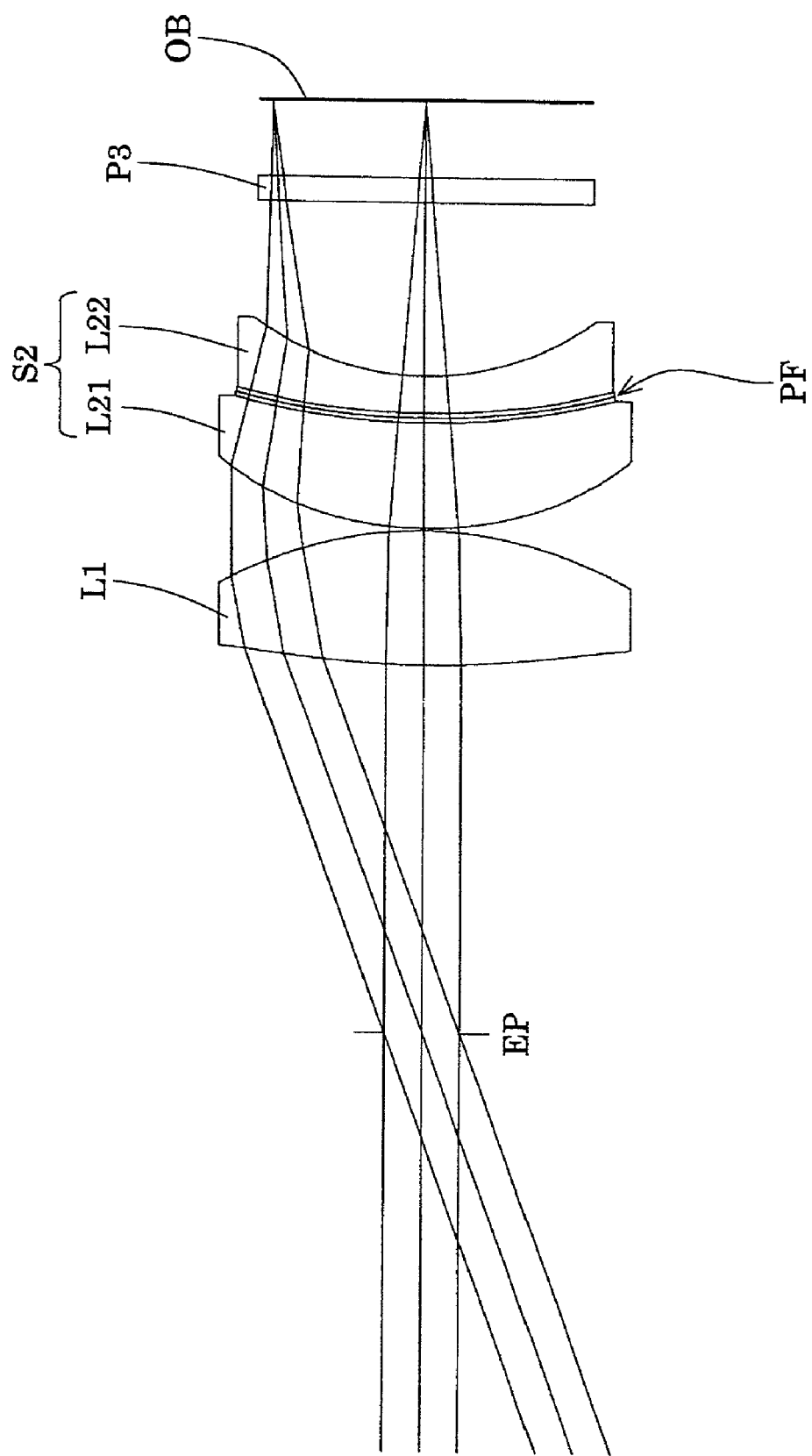

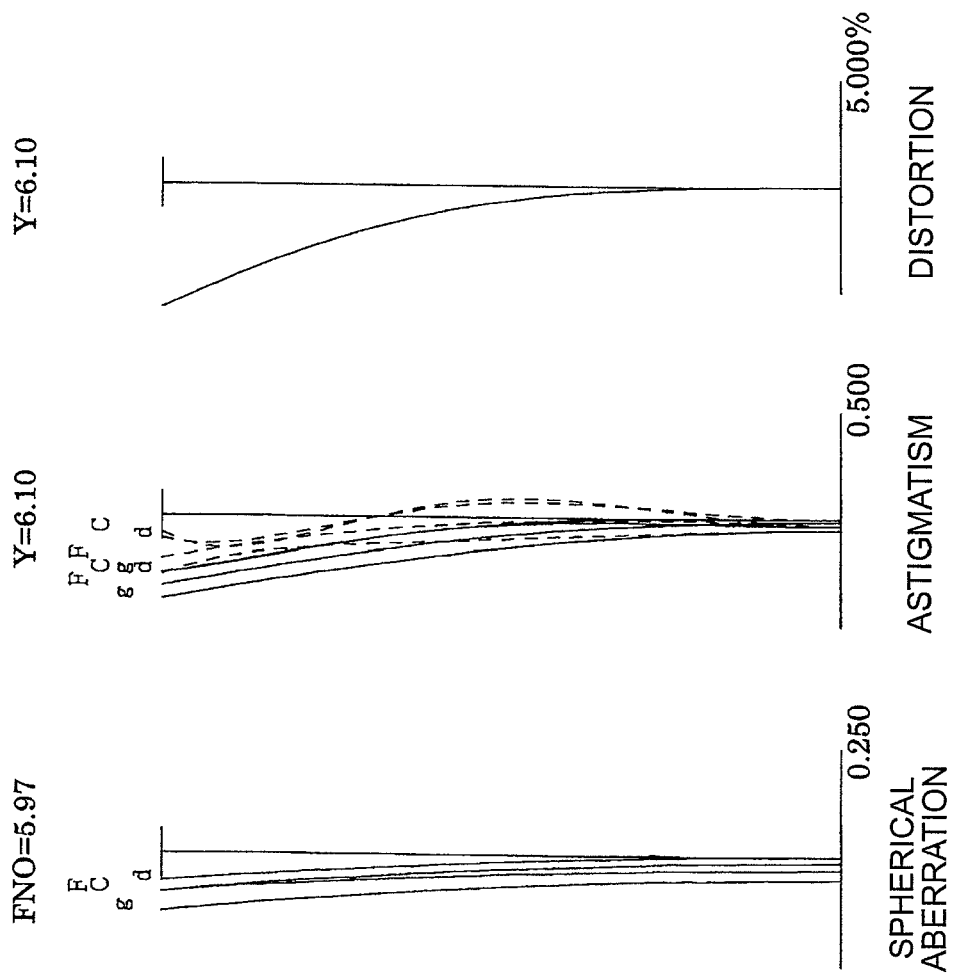

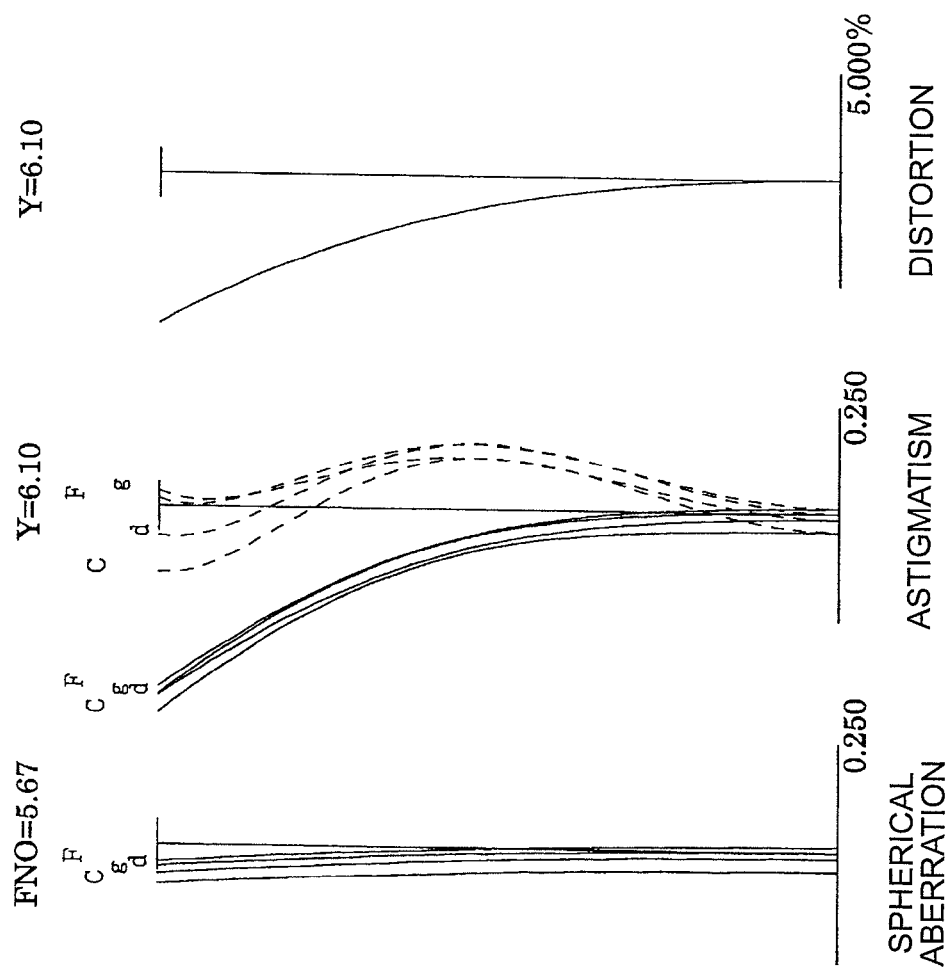

U.S. 7,990,615 B2

DIFFRACTIVE OPTICAL SYSTEM AND EYEPIECE OPTICAL SYSTEM

CROSS-REFERENCE TO RELATED APPLICATIONS

This application is a continuation application of PCT/JP2008/062612 filed Jul. 11, 2008 claiming the benefit of priority of the Japanese Patent Application No. 2007-188905 filed on Jul. 20, 2007, the entire contents of which are incorporated herein by reference.

BACKGROUND

1. Field

The present invention relates to a diffractive optical system.

2. Explanation of Related Art

Dioptric elements making use of refraction (lenses made principally of glass) are generally used in optical systems, in order to improve optical performance and, particularly, in order to restrain occurrence of aberration to improve imaging performance. In this case, in order to adequately suppress the Seidel's five aberrations and chromatic aberration at a reference spectral line, it is necessary to increase degrees of freedom of aberration correction and it is thus unavoidable to increase the number of lenses forming an optical system.

Particularly, in the case of an optical system used in a viewing optical system, an electronic viewfinder, or the like, the number of lenses forming the optical system tends to further increase when optical performance is attempted to improve. For achieving satisfactory correction for chromatic aberration of the optical system, it is necessary to use a plurality of optical materials with different refractive indices and dispersions and it is thus inevitable to use an optical material (glass) with a large specific gravity as well, which can readily cause increase in scale and weight of the optical system.

SUMMARY

Embodiments according to the present invention has been accomplished in view of the above-described problem and it is an object of the present invention to provide a diffractive optical system being downsized and lightweight and having excellent optical performance.

The embodiments according to the present invention provides a diffractive optical system comprising a diffractive optical element, the diffractive optical system comprising:
  a first lens component having a first positive lens, and a second lens component having a second positive lens and a negative lens,
  wherein the diffractive optical element comprises a first diffractive optical member having a first diffractive optical surface, and a second diffractive optical member having a second diffractive optical surface,
  wherein the first diffractive optical member and the second diffractive optical member are arranged so that the first diffractive optical surface and the second diffractive optical surface are opposed to each other, and
  wherein a refractive index of the first diffractive optical member and a refractive index of the second diffractive optical member at the d line are different from each other.

In the present specification, the expression of being "arranged so that the first diffractive optical surface and the second diffractive optical surface are opposed to each other" corresponds to a general concept embracing a state of being "arranged so that the first diffractive optical surface and the second diffractive optical surface are in contact with each other" and a state of being "arranged so that the first diffractive optical surface and the second diffractive optical surface are opposed with a space between them."

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 2 is a drawing schematically showing a configuration of an eyepiece optical system according to a first example.

FIG. 3 is a drawing showing spherical aberration, astigmatism, distortion, and coma in the eyepiece optical system of the first example.

FIG. 7 is a drawing showing spherical aberration, astigmatism, distortion, and coma in the eyepiece optical system of the third example.

DESCRIPTION

An embodiment of the present invention will be described based on the accompanying drawings. Prior to specific description of the embodiment of the present invention, technical matter relevant to the embodiment of the present invention will be described below. A variety of attempts, for example, to incorporate diffractive optical surfaces in an optical system such as a pickup lens for optical disks have been made heretofore in order to achieve high performance and size reduction that cannot be achieved by dioptric and catoptric systems. However, a monolayer diffractive optical element is likely to generate a considerable amount of diffraction flare with light of wavelengths off a designed wavelength, and the optical system thus becomes subject to deterioration of image quality and imaging performance. As a result, application of the monolayer diffractive optical element was limited, for example, to optical systems whose used light was laser light of a single wavelength or laser light in a narrow wavelength band.

In recent years, a diffractive optical element called a multilayered type (or laminated type) has been proposed. The multilayered diffractive optical element is constructed, for example, by laminating a plurality of diffractive optical constituents (diffractive optical members) having saw-toothed diffractive optical surfaces rotationally symmetric with respect to an optical axis, in a mutually separate or contact form. The multilayered diffractive optical element has a feature of being capable of ensuring high diffraction efficiencies over the whole of a desired wide wavelength region (e.g., the visible light region) and, in turn, ensuring good wavelength characteristics.

Figure 1A:
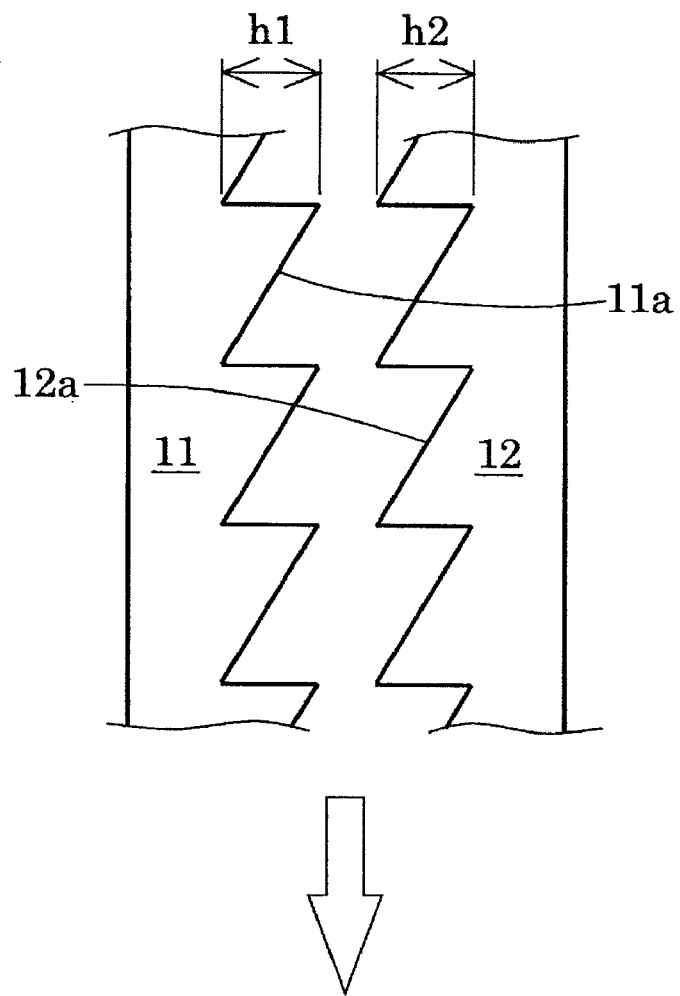
FIGS. 1A and 1B are drawings to illustrate a basic configuration and action of a multilayered diffractive optical element.
Figure 1B:
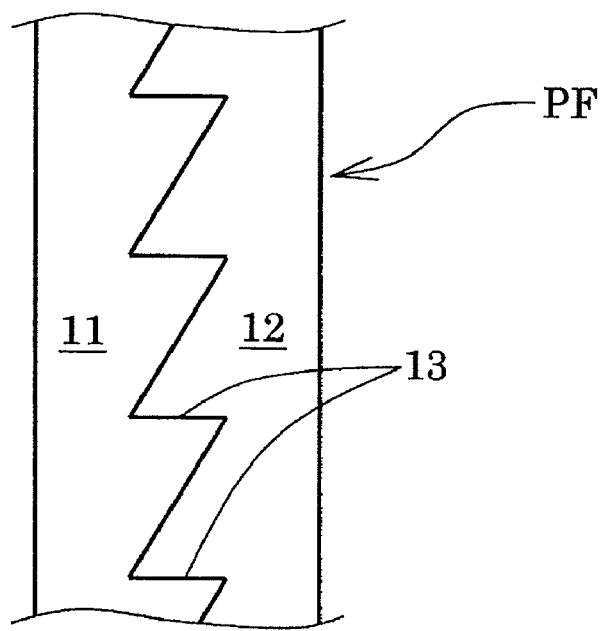

A multilayered diffractive optical element, for example, as shown in FIGS. 1A and 1B, is composed of a first diffractive optical member 11 arranged on the entrance side of light and made of a first optical material, and a second diffractive optical member 12 arranged on the exit side of light and made of a second optical material having a refractive index and dispersion different from those of the first optical material. A pair of opposed surfaces 11a and 12a of the first diffractive optical member 11 and the second diffractive optical member 12 have, for example, their respective saw-toothed cross sections rotationally symmetric with respect to the optical axis (not shown). In this case, in order to simultaneously satisfy an achromatism condition for light of two specific wavelengths, a grating height (depth of grooves) h1 of the diffractive optical surface 11a of the first diffractive optical member 11 can be determined to be a predetermined value and a grating height h2 of the diffractive optical surface 12a of the second diffractive optical member 12 a predetermined value.

As a result, the multilayered diffractive optical element can achieve the diffraction efficiency of 1.0 for the light of the specific wavelengths and considerably high diffraction efficiencies for light of the other wavelengths as well. The diffraction efficiency herein is defined, in a transmission type diffractive optical element, as a ratio $\eta = I_1/I_0$ of intensity $I_1$ of first-order diffracted light in light transmitted by the diffractive optical element, to intensity $I_0$ of light entering the diffractive optical element. By adopting such a multilayered configuration, it becomes feasible to apply the diffractive optical element to an optical system whose used light is light in a wide wavelength band and it is also easy to use the diffractive optical element, for example, in a taking lens or the like of a photographic camera using white light.

Particularly, when the first optical material and the second optical material satisfy a predetermined condition (cf. Condition (1) below), the grating height h1 of the diffractive optical surface 11a of the first diffractive optical member 11 can be matched with the grating height h2 of the diffractive optical surface 12a of the second diffractive optical member 12 and, in turn, we can obtain the contact multilayered diffractive optical element (diffraction grating) PF which is arranged so that the diffractive optical surface 11a and the diffractive optical surface 12a are in contact with each other as shown in FIG. 1 (b). The contact multilayered diffractive optical element has the advantage in terms of manufacture that the error sensitivity (tolerance) of the grating heights of the diffractive optical surfaces and the error sensitivity (tolerance) of surface roughness of the diffractive optical surfaces both are gentler than in the separate multilayered diffractive optical element which is arranged so that the pair of diffractive optical surfaces are opposed with a space between them, as shown in FIG. 1 (a). Namely, the contact multilayered diffractive optical element has the advantages of excellent productivity, high mass productivity, and expediency for cost reduction of optical products.

The configuration and action of the embodiment of the present invention will be described below. A diffractive optical system of the embodiment of the present invention including a diffractive optical element, for example, when applied to a viewing optical system such as an eyepiece optical system, is provided with a first lens component having a first positive lens, and a second lens component having a second positive lens and a negative lens, in order from the observer eye side (e.g., the side opposite to an intermediate image as an observed object). For example, when applied to a projection optical system, the diffractive optical system is provided with a first lens component having a first positive lens, and a second lens component having a second positive lens and a negative lens, in order from the screen side (e.g., the side opposite to the object plane like a display device). The contact multilayered or separate multilayered diffractive optical element is arranged at a predetermined position in the optical path of the optical system, for example, so as to be in contact with any one optical surface out of an optical surface of the first positive lens, an optical surface of the second positive lens, and an optical surface of the negative lens.

The embodiment of the present invention involves incorporating the contact multilayered or separate multilayered diffractive optical element in the optical system of the basic configuration applicable, for example, to the viewing optical system and the projection optical system, thereby realizing the downsized, lightweight, compact, and high-performance optical system well corrected for chromatic aberration over a wide wavelength range and securing satisfactorily high diffraction efficiencies. In other words, the embodiment of the present invention can realize the diffractive optical system being downsized and lightweight and having excellent optical performance, for example, suitable for the viewing optical system, projection optical system, etc., by the action of the contact multilayered or separate multilayered diffractive optical element.

The two diffractive optical members constituting the multilayered diffractive optical element need to be one made of an optical material having a relatively high refractive index and low dispersion and the other made of an optical material having a relatively low refractive index and high dispersion, and either one of the diffractive optical members may be arranged on the entrance side of light. Particularly, in the case of the contact multilayered diffractive optical element, it is important to select the combination of the optical material having the relatively high refractive index and low dispersion with the optical material having the relatively low refractive index and high dispersion. For loosening the manufacturing error sensitivity of the contact multilayered diffractive optical element to a desired level, it is important to make a refractive index difference between the two diffractive optical members smaller than 0.45 and it is preferable to set the refractive index difference smaller than 0.2.

Specifically, in the diffractive optical system of the embodiment of the present invention, in the aforementioned configuration, the refractive index difference $\Delta N_d$ between the first diffractive optical member and the second diffractive optical member at the d line ($\lambda=587.6$ nm) satisfies Condition (1) below.

$$0.005 < \Delta N_d < 0.45 \quad (1)$$

Condition (1) defines an appropriate range for the refractive index difference $\Delta N_d$ between the two diffractive optical members constituting the multilayered diffractive optical element. Above the upper limit of Condition (1), the refractive index difference $\Delta N_d$ becomes so large as to cause the disadvantage that the sensitivity for manufacturing errors of the gratings of the diffractive optical surfaces becomes too large. Below the lower limit of Condition (1), the grating heights required of the diffractive optical surfaces become too large, which is disadvantageous in terms of manufacture. Furthermore, it results in making shadows because of wall surfaces of the gratings (surface portions forming level differences: indicated by reference symbol 13 in FIG. 1), and therefore it results in causing reduction in diffraction efficiency of blaze light and generating a significant amount of stray light due to scattering and reflection of light incident to the wall surfaces of the gratings, so as to tend to degrade the image quality. For adequately exercising the effect of the embodiment of the present invention, it is desirable to set the upper limit of Condition (1) to 0.2. It is also desirable to set the lower limit of Condition (1) to 0.01.

The diffractive optical system of the embodiment of the present invention is preferably configured as follows: of the two diffractive optical members constituting the multilayered diffractive optical element, one diffractive optical member (on the entrance side or on the exit side of light) is made of an optical material having a relatively high refractive index and low dispersion, the other diffractive optical member (on the exit side or on the entrance side of light) is made of an optical material having a relatively low refractive index and high dispersion, and Condition (2) below is satisfied. In Condition (2), $\Delta N_C$ is a refractive index difference between the two diffractive optical members at the C line ($\lambda=656.3$ nm) and $\Delta N_F$ is a refractive index difference between the two diffractive optical members at the F line ($\lambda=486.1$ nm).

$$\Delta N_F - \Delta N_C < 0 \quad (2)$$

Condition (2) defines a relation of refractive indices and dispersions for the condition defined in Condition (1), and defines an appropriate arrangement of the refractive indices and dispersions of the two diffractive optical members constituting the multilayered diffractive optical element. When Condition (2) is satisfied, satisfactorily high diffraction efficiencies can be ensured over a wide wavelength range. In other words, when Condition (2) is not satisfied, the required diffraction efficiencies cannot be achieved over the required wavelength range.

In the diffractive optical system of the embodiment of the present invention, Condition (3) below is preferably satisfied. In Condition (3), $E_d$ is a diffraction efficiency of the multi-layered diffractive optical element at the d line which is a principal wavelength, $E_g$ a diffraction efficiency of the multilayered diffractive optical element at the g line ($\lambda=435.8$ nm) which is a wavelength shorter than the principal wavelength, and $E_C$ a diffraction efficiency of the multilayered diffractive optical element at the C line which is a wavelength longer than the principal wavelength.

$$(E_g + E_C)/(2 \times E_d) > 0.8 \quad (3)$$

Condition (3) defines an appropriate range for a balance among the diffraction efficiencies for the wideband used light. Below the lower limit of Condition (3), the diffraction efficiency becomes too lowered at least at one wavelength of the g line being the relatively shorter wavelength and the C line being the relatively longer wavelength than the d line being the principal wavelength, so as to unfavorably increase the diffraction flare and degrade the image quality eventually. In other words, light of wavelengths other than the blaze light, light at the field angle, etc. will become unwanted diffracted light to cause considerable flare, so as to result in failure in obtaining good image quality. For adequately exercising the effect of the embodiment of the present invention, it is desirable to set the lower limit of Condition (3) to 0.9. It is also desirable to set the upper limit of Condition (3) to 0.99.

The diffractive optical system of the embodiment of the present invention is preferably configured as follows: the diffractive optical element has the contact multilayered form and Condition (4) below is satisfied. In Condition (4), $\Delta N_d$ is the refractive index difference between the first diffractive optical member and the second diffractive optical member at the d line as described above, and $\Delta(N_F - N_C)$ is a difference between primary dispersions ($N_F - N_C$) of the first diffractive optical member and the second diffractive optical member.

$$-15 < \Delta N_d / \Delta(N_F - N_C) < -2 \quad (4)$$

Condition (4) defines an appropriate range for the difference between the primary dispersions (average dispersions) of the optical material with the high refractive index and low dispersion and the optical material with the low refractive index and high dispersion forming the contact multilayered diffractive optical element. Above the upper limit of Condition (4), required high diffraction efficiencies cannot be achieved for wavelengths over a wide band. As a result, the light of wavelengths other than the blaze light, the light at the field angle, etc. will become unwanted diffracted light to cause a significant amount of flare, so as to unfavorably result in failure in obtaining good image quality. Below the lower limit of Condition (4), similarly, required high diffraction efficiencies cannot be achieved for wavelengths over a wide band, which is unfavorable. For adequately exercising the effect of the embodiment of the present invention, it is desirable to set the upper limit of Condition (4) to −3. It is also desirable to set the lower limit of Condition (4) to −12.

In the diffractive optical system of the embodiment of the present invention, the multilayered diffractive optical element having the diffractive optical surfaces where a maximum angle of incidence of principal rays is not more than 10° is preferably arranged so as to be in contact with any one optical surface out of the optical surface of the first positive lens, the optical surface of the second positive lens, and the optical surface of the negative lens. If light is obliquely incident to the wall surfaces of the diffractive optical element, the light will be reflected on the wall surfaces of the diffractive optical element and can make shadow portions and cause flare as well. In contrast to it, when the light is incident in parallel to the wall surfaces of the diffractive optical element as much as possible, the light is prevented from being reflected in the diffractive optical element, which is preferred. Particularly, since the diffractive optical system is provided with at least three lenses, the first positive lens, the second positive lens, and the negative lens, it is desirable to devise the arrangement of the diffractive optical element as described above.

Furthermore, Condition (5) below is preferably satisfied. In Condition (5), $\phi$ is an effective diameter (diameter) of the diffractive optical surfaces and f the focal length of the diffractive optical system.

$$0.1 < \phi/f < 3.0 \quad (5)$$

Condition (5) defines an appropriate range for the effective diameter (diameter) $\phi$ of the diffractive optical surfaces. Above the upper limit of Condition (5), the effective diameter $\phi$ of the diffractive optical surfaces becomes too large, so as to make manufacture of the diffractive optical surfaces difficult and, in turn, result in a rise in cost of the multilayered diffractive optical element. Furthermore, it is unpreferable because harmful light from the outside becomes likely to enter the diffractive optical surfaces and the flare and others tend to cause deterioration of image quality. Below the lower limit of Condition (5), the effective diameter $\phi$ of the diffractive optical surfaces becomes too small, and a tendency of decreasing the grating pitch of the diffractive optical surfaces becomes stronger, so as to make the manufacture of the multilayered diffractive optical element difficult and cause a rise of cost and so as to generate a significant amount of flare due to the gratings of the diffractive optical surfaces to readily cause deterioration of image quality; therefore, it is unfavorable. For adequately exercising the effect of the embodiment of the present invention, it is desirable to set the upper limit of Condition (5) to 1.5. It is also desirable to set the lower limit of Condition (5) to 0.3.

The diffractive optical system of the embodiment of the present invention is preferably configured as follows: the diffractive optical element has the contact multilayered form and Condition (6) below is satisfied. In Condition (6), h is the grating height of the first diffractive optical surface and the second diffractive optical surface and D a smaller thickness out of the thickness along the optical axis of the first diffractive optical member and the thickness along the optical axis of the second diffractive optical member.

$$0.05 < h/D < 2.0 \quad (6)$$

Condition (6) defines a condition necessary for realizing the relatively thin contact multilayered diffractive optical element. Above the upper limit of Condition (6), the grating of the diffractive optical surfaces becomes relatively too high, which makes it difficult to form the grating shape. Furthermore, it is also unpreferable because the step portions of the gratings become large to readily generate stray light due to scattering and others of light incident to the wall surfaces. Below the lower limit of Condition (6), the diffractive optical members become relatively too thick, which also makes it difficult to form the grating shape. Furthermore, it is also unpreferable because internal absorption of light increases in the optical materials to decrease the transmittance of the multilayered diffractive optical element and decrease the transmittance of the optical system eventually, and coloring is likely to occur, so as to degrade the image quality. For adequately exercising the effect of the embodiment of the present invention, it is desirable to set the upper limit of Condition (6) to 0.7. It is also desirable to set the lower limit of Condition (6) to 0.02.

The diffractive optical system of the embodiment of the present invention is preferably configured as follows: for example, in order from the observer eye side (or from the screen side), the optical system comprises a first positive lens, and a second lens component having a second positive lens and a negative lens and the multilayered diffractive optical element is arranged so as to be in contact with either one optical surface out of an optical surface of the first positive lens and an optical surface of the second positive lens nearest to the observer eye side (or the screen side). This configuration allows achromatism to be well achieved and realizes the compact optical system.

The diffractive optical system of the embodiment of the present invention is preferably configured as follows: the wall surfaces of the gratings of the diffractive optical surfaces in the first diffractive optical member and the second diffractive optical member are formed with an inclination relative to the optical axis so as to correspond to an inclination of incident rays to the optical axis. This configuration prevents scattering and reflection on the wall surfaces of rays obliquely incident to the multilayered diffractive optical element, so as to suppress occurrence of flare and therefore provide a good image with little flare.

Incidentally, the effect of achromatism can be achieved independent of the position of the diffractive optical surfaces in the optical path and, therefore, independent of the position of the multilayered diffractive optical element, but, for enhancing the durability of the diffractive optical element, it is preferable to adopt a configuration wherein the second lens component is a cemented lens and wherein the contact multilayered diffractive optical element is incorporated in a joint surface of the cemented lens. Furthermore, if an adhesive resin is used as an optical material for forming the diffractive optical member, this resin can preferably function as an adhesive. In the cemented lens, a concave surface with a relatively strong curvature can be arranged so as to be in contact with the object side of the diffractive optical element (the observed object side, the display device side, or the like). This configuration allows the angle of incidence to be set small to the diffractive surfaces in accordance with a ray passage condition.

Furthermore, in order to achieve better optical performance and specifications, the diffractive optical system of the embodiment of the present invention is preferably configured as follows: for example, a joint surface of the cemented lens is convex on the first positive lens side (observer eye side, screen side, or the like) and the multilayered diffractive optical element is incorporated in the joint surface of the cemented lens. The optical system preferably satisfies Conditions (7) to (10) below. In Condition (7), PS is the Petzval sum of the diffractive optical system and f the focal length of the diffractive optical system as described above.

Condition (8) is associated with a viewing optical system, for example, for viewing an image formed on a compact display or for viewing an enlarged image formed through an objective lens, where H represents the pupil diameter (diameter), R an eye relief (distance from the eye point to the optical surface nearest to the observer eye side), and f the focal length of the diffractive optical system as described above. In Conditions (9) and (10), $\Delta W$ is a maximum broadening width of longitudinal chromatic aberration of the spectral lines d, g, C, and F, and f the focal length of the diffractive optical system as described above. Furthermore, in Condition (10), $E_d$, $E_g$, and $E_C$ are the diffraction efficiencies of the multilayered diffractive optical element at the d line, the g line, and the C line, respectively, as described above.

$$0.0002 < PS/f < 0.01 \quad (7)$$

$$0.05 H \times R/f^2 < 5.0 \quad (8)$$

$$0.001 < \Delta W/f < 0.05 \quad (9)$$

$$(E_g + E_d + E_C) \times f/\Delta W > 200 \quad (10)$$

Condition (7) defines an appropriate range for the value of the Petzval sum of the entire optical system normalized by the focal length f, for ensuring good flatness of field. Above the upper limit of Condition (7), the curvature of field becomes too large on the negative side and good image quality cannot be achieved, which is unpreferred. Below the lower limit of Condition (7), the curvature of field becomes too large on the positive side and good image quality cannot be achieved, which is not preferable. For adequately exercising the effect of the embodiment of the present invention, it is desirable to set the upper limit of Condition (7) to 0.005. It is also desirable to set the lower limit of Condition (7) to 0.0005.

Condition (8) defines an appropriate relation among the pupil diameter H, the eye relief R, and the focal length f in application of the diffractive optical system of the embodiment of the present invention to the viewing optical system. For configuring the viewing optical system, it is important to secure the eye relief of an appropriate length. Above the upper limit of Condition (8), the eye relief R becomes too long, so as to readily cause increase in the scale of the optical system unpreferably. Below the lower limit of Condition (8), the eye relief R becomes too short, which makes viewing difficult in a wearing state of eyeglasses. Since the pupil diameter also becomes small, the effective beam becomes likely to be blocked and thus viewing becomes difficult in practical use unpreferably. The shape of the pupil does not have to be circular, but may be rectangular or elliptic according to use or design specifications. The pupils of these shapes can be achieved by devising the lens shape and the shape of the stop. For adequately exercising the effect of the embodiment of the present invention, it is desirable to set the upper limit of Condition (8) to 2.0. It is also desirable to set the lower limit of Condition (8) to 0.08.

Condition (9) defines an appropriate correction range for longitudinal chromatic aberration. Above the upper limit of Condition (9), the chromatic aberration becomes too large, so as to form a colored image and significantly degrade the image quality unpreferably. Below the lower limit of Condition (9), it unfavorably becomes necessary to use a special optical material such as an anomalous dispersion glass. For adequately exercising the effect of the embodiment of the present invention, it is desirable to set the upper limit of Condition (9) to 0.02. It is also desirable to set the lower limit of Condition (9) to 0.002.

Condition (10) is a conditional expression defining the required diffraction efficiencies and correction for chromatic aberration for the optical system over a wide band of wavelengths of used light. Condition (10) indicates that the larger the numerical value thereof, the higher the diffraction efficiencies and the smaller the longitudinal chromatic aberration for wavelengths over a wide band. Below the lower limit of Condition (10), it unfavorably becomes difficult to achieve the required diffraction efficiencies and correction for chromatic aberration. For adequately exercising the effect of the embodiment of the present invention, it is desirable to set the lower limit of Condition (10) to 400.

Particularly, in the diffractive optical system according to the embodiment, Conditions (9) and (10) show that significant contribution is made by having the multilayered diffractive optical element in the optical system provided with the first positive lens, second positive lens, and negative lens.

For actually configuring the diffractive optical system of the embodiment of the present invention, it is preferable to satisfy requirements described below. In the multilayered diffractive optical element of the embodiment of the present invention, the viscosity of the optical materials forming the diffractive optical members (viscosity of uncured materials) is preferably between 5 mPa·s inclusive and 50000 mPa·s inclusive, in order to hold good moldability and ensure excellent mass productivity. When the optical material is a resin having the viscosity of not more than 5 mPa·s, the resin is likely to flow during molding, so as to degrade workability. When the optical material is a resin having the viscosity of not less than 50000 mPa·s, the resin is unlikely to flow, so as to degrade workability and make bubbles readily mixed.

Furthermore, the diffractive optical members forming the multilayered diffractive optical element both are preferably made of UV curing resin, for the reasons of production, particularly, in terms of improvement in production efficiency. In this case, man-hours can be advantageously reduced for production of the multilayered diffractive optical element, so as to reduce cost. For reducing the scale and weight of the multilayered diffractive optical element and, therefore, for reducing the scale and weight of the diffractive optical system, the both resin materials forming the pair of diffractive optical members preferably have the specific gravity of not more than 2.0. Since resin has the specific gravity smaller than glass, it is very effective in reduction of weight of the optical system to form the multilayered diffractive optical element of resin. For achieving further reduction in scale and weight of the optical system, the multilayered diffractive optical element is preferably made of resin having the specific gravity of not more than 1.6.

Furthermore, it is preferable to locate a refractive surface with a positive refractive power at an interface to air of the first diffractive optical member and the second diffractive optical member (the optical surfaces opposite to the diffractive optical surfaces) and to form this refractive surface with the positive refractive power in an aspherical shape. The optical system can also be provided with a color filter effect by mixing a pigment in the resin making at least one of the first diffractive optical member and the second diffractive optical member. For example, it is possible to construct a compact imaging optical system by forming an infrared cut filter or the like for countermeasures to stray light in CCD.

A stop can be optionally located at an appropriate position in the optical path of the optical system, and it is preferable to configure the stop so as to block (or cut) unwanted rays and transmit only effective rays contributing to imaging. For example, a lens frame itself may be configured to function as an aperture stop, or the stop may be configured by a mechanical member positioned at a location apart from the lenses. The shape of the aperture of the stop is not limited to a circular shape, but may be, for example, an elliptic or rectangular shape.

When the diffractive optical system of the embodiment of the present invention is applied to a viewing optical system, it is preferable to use it in the viewing optical system whose loupe magnification B is not less than 2× and not more than 20×. An optical system consisting of a plurality of constituent elements obtained by incorporating the diffractive optical system of the embodiment of the present invention also falls within the scope of the present invention. Furthermore, the same also applies to diffractive optical systems obtained by incorporating a gradient index lens, a crystal material lens, or the like. The below will describe examples as specific numerical examples of the present embodiment. Each of examples of the present embodiment is application of the diffractive optical system of the embodiment of the present invention to an eyepiece optical system.

FIRST EXAMPLE

FIG. 2 is a drawing schematically showing a configuration of an eyepiece optical system according to the first example. With reference to FIG. 2, the eyepiece optical system according to the first example has the following elements in order from the eye point side (observer eye side), for example, in an optical path between an observed object OB like an intermediate image formed through an objective system, and the eye point EP: a biconvex lens L1 with a convex surface of an aspherical shape on the eye point side and a convex surface of an aspherical shape on the observed object side; a cemented lens S2 consisting of a positive meniscus lens L21 with a convex surface of an aspherical shape on the eye point side and a negative meniscus lens L22 with a convex surface on the eye point side; and a plane-parallel plate P3 as a cover glass. A contact multilayered diffractive optical element PF is incorporated in a joint surface of the cemented lens S2. The overall field angle of this eyepiece optical system is 39.8°.

In each of examples including the first example, each aspherical surface is represented by Formula (a) below, where y represents a height in a direction perpendicular to the optical axis, z a distance (sag) along the optical axis from a tangent plane at a top of the aspherical surface to a position on the aspherical surface at the height y, r a radius of curvature at the top, κ a conical coefficient, and $C_n$ an nth-order aspherical coefficient. In Tables (1) to (3) below, each lens surface formed in an aspherical shape is accompanied by * mark to the right of a surface number.

$$z=(y^2/r)/[1+\{1-\kappa \cdot y^2/r^2\}^{1/2}]+C_2 \cdot y^2+C_4 \cdot y^4+C_6 \cdot y^6+C_8 \cdot y^8+C_{10} \cdot y^{10} \quad (a)$$

Table (1) below provides values of specifications of the eyepiece optical system according to the first example. In the principal specifications of Table 1, f represents the focal length of the eyepiece optical system and R the eye relief. In the specifications of the optical members in Table (1), the surface number in the first column represents an order of each surface from the eye point side, r in the second column the radius of curvature of each surface (radius of curvature at the top in the case of an aspherical surface), d in the third column an axial spacing or surface separation of each surface, n(d) in the fourth column the refractive index for the d line ($\lambda$=587.6 nm), n(g) in the fifth column the refractive index for the g line ($\lambda$=435.8 nm), n(C) in the sixth column the refractive index for the C line ($\lambda$=656.3 nm), and n(F) in the seventh column the refractive index for the F line ($\lambda$=486.1 nm). The sign convention for the radius r of curvature is so defined that the radius of curvature of a convex surface on the eye point side is positive and that the radius of curvature of a concave surface on the eye point side is negative.

In the specifications of the optical members in Table (1), the contact multilayered diffractive optical element PF is expressed according to the ultra high index method (UHI method). In the ultra high index method, the diffractive optical surfaces of the contact multilayered diffractive optical element PF are regarded as a "thin lens" and the optical properties of the diffractive optical surfaces are expressed by a medium with a very high refractive index and the aspherical surface formula.

Specifically, in the case of the first example, the fourth surface in the specifications of the optical members in Table (1) corresponds to the entrance surface of the diffractive optical element PF (the entrance surface of the first diffractive optical member arranged on the entrance side of light) and the seventh surface corresponds to the entrance surface of the negative meniscus lens L22. The refractive index data of the fifth surface and the aspherical surface data of the sixth surface express the optical properties of the diffractive optical surfaces of the contact multilayered diffractive optical element PF. A, B, C, and D in the specifications of the optical members in Table (1) represent the refractive indices for the d line, the g line, the C line, and the F line, respectively, corresponding to the fifth surface. The notation in Table (1) also applies similarly to Tables (2) and (3) below.

TABLE (1)

(Principal Specifications)

f = 17.898
R = 15.000

(Specifications of Optical Members) SN: Surface number

| SN | r | d | n(d) | n(g) | n(C) | n(F) | Optical member |
|---|---|---|---|---|---|---|---|
|  | (EP) | 15.00000 |  |  |  |  |  |
| 1* | 32.65150 | 5.44704 | 1.533040 | 1.545110 | 1.530340 | 1.539810 | (L1) |
| 2* | −15.00000 | 0.10000 |  |  |  |  |  |
| 3* | 15.00000 | 4.29698 | 1.533040 | 1.545110 | 1.530340 | 1.539810 | (L21) |
| 4 | 29.52801 | 0.20000 | 1.518900 | 1.538000 | 1.514400 | 1.528900 | (PF) |
| 5 | 29.52801 | 0.00000 | A | B | C | D |  |
| 6* | 29.52843 | 0.20000 | 1.556900 | 1.570900 | 1.553600 | 1.564700 |  |
| 7 | 29.52801 | 1.50000 | 1.614200 | 1.646300 | 1.607400 | 1.631400 | (L22) |
| 8 | 11.36010 | 7.00000 |  |  |  |  |  |
| 9 | ∞ | 1.00000 | 1.522160 | 1.533190 | 1.519460 | 1.528340 | (P3) |
| 10 | ∞ | 3.08122 |  |  |  |  |  |

$A = 0.100010000 \times 10^5$,
$B = 0.741868530 \times 10^4$
$C = 0.111704255 \times 10^5$,
$D = 0.827473110 \times 10^4$ (Aspherical Surface Data)

1st surface:

$\kappa = 1.0000$ $\quad$ $C_2 = 0$
$C_4 = -8.14380 \times 10^{-5}$ $\quad$ $C_6 = -1.50000 \times 10^{-7}$
$C_8 = 1.39980 \times 10^{-8}$ $\quad$ $C_{10} = -1.58070 \times 10^{-10}$ 2nd surface:

$\kappa = 1.0000$ $\quad$ $C_2 = 0$
$C_4 = 7.14350 \times 10^{-5}$ $\quad$ $C_6 = -8.94640 \times 10^{-7}$
$C_8 = 1.66610 \times 10^{-8}$ $\quad$ $C_{10} = -1.30130 \times 10^{-10}$ 3rd surface:

$\kappa = 1.0000$ $\quad$ $C_2 = 0$
$C_4 = 1.16680 \times 10^{-4}$ $\quad$ $C_6 = -1.60920 \times 10^{-6}$
$C_8 = 2.44700 \times 10^{-8}$ $\quad$ $C_{10} = -1.22680 \times 10^{-10}$ 6th surface:

$\kappa = 1.0000$ $\quad$ $C_2 = 0$
$C_4 = 6.90020 \times 10^{-9}$ $\quad$ $C_6 = -2.91240 \times 10^{-10}$
$C_8 = 5.58910 \times 10^{-12}$ $\quad$ $C_{10} = -3.90380 \times 10^{-14}$

TABLE (1)-continued (Values Corresponding to Conditions)

$\Delta N_d = 0.038$
$\Delta N_F = 0.0358$
$\Delta N_C = 0.0392$
$E_g = 0.944$
$E_C = 0.965$
$E_d = 0.997$
$\Delta(N_F - N_C) = -0.0034$
$\phi = 15.3$
$f = 17.898$
$h = 0.015$
$D = 0.2$
$PS = 0.02463$
$H = 3.0$
$R = 15.000$
$\Delta W = 0.05227$
  (1) $\Delta N_d = 0.038$
  (2) $\Delta N_F - \Delta N_C = -0.0034$
  (3) $(E_g + E_C)/(2 \times E_d) = 0.957$
  (4) $\Delta N_d/\Delta(N_F - N_C) = -11.176$
  (5) $\phi/f = 0.8548$
  (6) $h/D = 0.075$
  (7) $PS/f = 0.00138$
  (8) $H \times R/f^2 = 0.141$
  (9) $\Delta W/f = 0.00292$
  (10) $(E_g + E_d + E_C) \times f/\Delta W = 995.056$ FIG. 3 is a drawing showing the spherical aberration, astigmatism, distortion, and coma in the eyepiece optical system of the first example. The aberration states show the results of ray tracing from the eye point side. In the aberration diagrams, FNO represents the F number, Y an object height (image height of intermediate image) at the observed object OB, d the d line ($\lambda$=587.6 nm), g the g line ($\lambda$=435.8 nm), F the F line ($\lambda$=486.1 nm), and C the C line ($\lambda$=656.3 nm). In the aberration diagram showing the astigmatism, solid lines represent sagittal image surfaces and dashed lines meridional image surfaces. The notation in FIG. 3 also applies similarly to FIGS. 5 and 7 below. As apparent from the aberration diagrams in FIG. 3, it is seen that while the eyepiece optical system of the first example is downsized and lightweight, it is well corrected for the various aberrations including chromatic aberration over the wide wavelength range from the g line to the C line and excellent optical performance is ensured.

SECOND EXAMPLE

Figure 4:
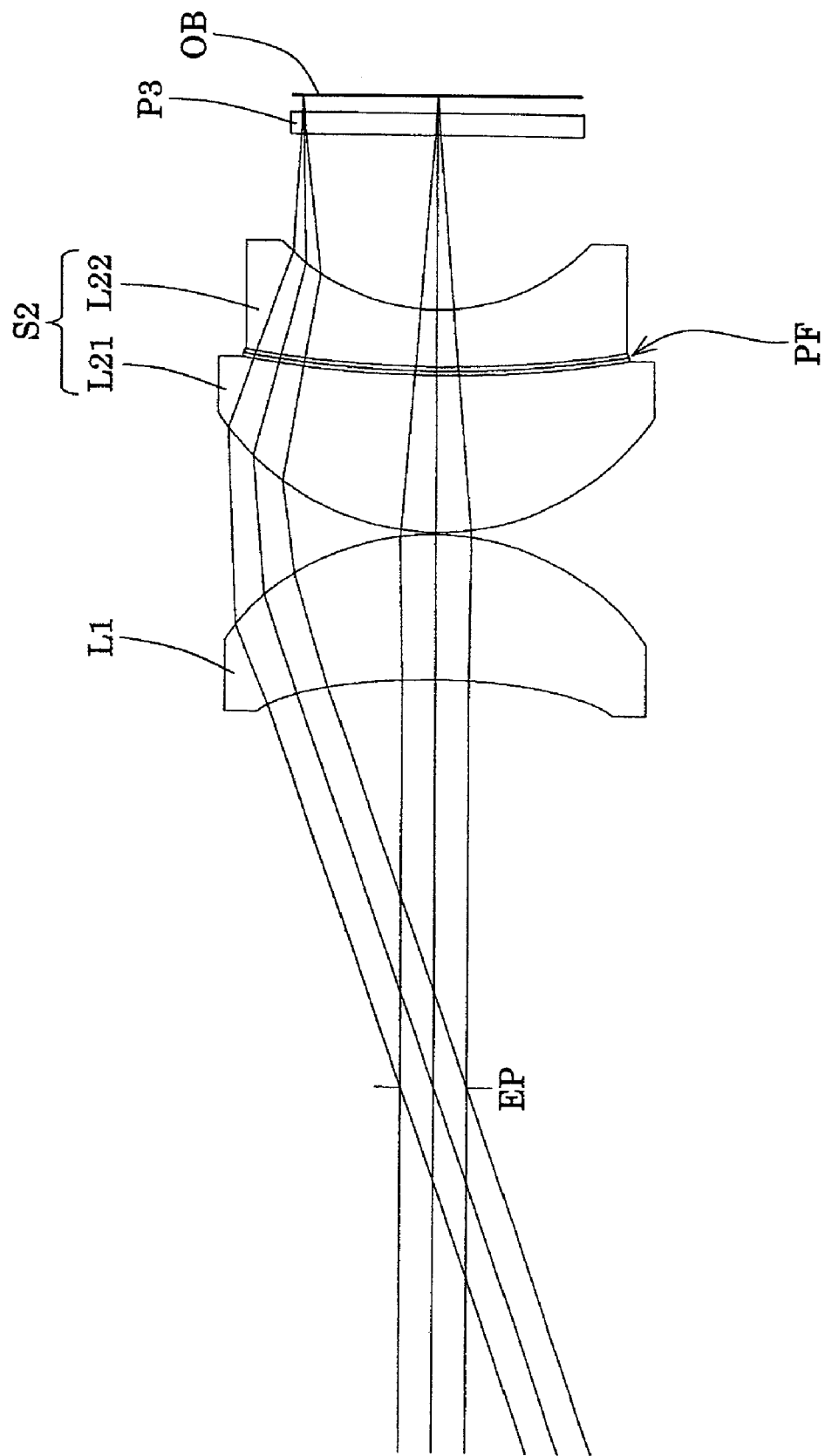
FIG. 4 is a drawing schematically showing a configuration of an eyepiece optical system according to a second example.

FIG. 4 is a drawing schematically showing a configuration of an eyepiece optical system according to the second example. With reference to FIG. 4, the eyepiece optical system according to the second example is composed of the following elements in order from the eye point side (observer eye side): a positive meniscus lens L1 with a concave surface of an aspherical shape on the eye point side and a convex surface of an aspherical shape on the observed object side; a cemented lens S2 consisting of a positive meniscus lens L21 with a convex surface of an aspherical shape on the eye point side and a negative meniscus lens L22 with a convex surface on the eye point side; and a plane-parallel plate P3 as a cover glass. A contact multilayered diffractive optical element PF is incorporated in the joint surface of the cemented lens S2. The overall field angle of this eyepiece optical system is 38.2°.

Table (2) below provides values of specifications of the eyepiece optical system according to the second example. In the second example, just as in the case of the first example, the fourth surface in the specifications of the optical members in Table (2) corresponds to the entrance surface of the diffractive optical element PF (entrance surface of the first diffractive optical member arranged on the entrance side of light) and the seventh surface to the entrance surface of the negative meniscus lens L22. The refractive index data of the fifth surface and the aspherical surface data of the sixth surface express the optical properties of the diffractive optical surfaces of the contact multilayered diffractive optical element PF.

TABLE (2)

(Principal Specifications)

$f = 18.583$
$R = 18.9$ (Specifications of Optical Members)
Surface Number

| SN | r | d | n(d) | n(g) | n(C) | n(F) | Optical Member |
|---|---|---|---|---|---|---|---|
|  | (EP) | 18.90000 |  |  |  |  |  |
| 1* | −33.68353 | 6.77396 | 1.533040 | 1.545110 | 1.530340 | 1.539810 | (L1) |
| 2* | −11.26842 | 0.10000 |  |  |  |  |  |
| 3* | 11.87368 | 7.28663 | 1.533040 | 1.545110 | 1.530340 | 1.539810 | (L21) |
| 4 | 51.74056 | 0.20000 | 1.518900 | 1.538000 | 1.514400 | 1.528900 | (PF) |

TABLE (2)-continued

| | | | A | B | C | D | |
|---|---|---|---|---|---|---|---|
| 5 | 51.74056 | 0.00000 | | | | | |
| 6* | 51.74175 | 0.20000 | 1.556900 | 1.570900 | 1.553600 | 1.564700 | |
| 7 | 51.74056 | 2.62500 | 1.614200 | 1.646300 | 1.607400 | 1.631400 | (L22) |
| 8 | 9.55579 | 8.00000 | | | | | |
| 9 | ∞ | 1.00000 | 1.522160 | 1.533190 | 1.519460 | 1.528340 | (P3) |
| 10 | ∞ | 0.83431 | | | | | |

$A = 0.100010000 \times 10^5$,
$B = 0.741868530 \times 10^4$,
$C = 0.111704255 \times 10^5$,
$D = 0.827473110 \times 10^4$ (Aspherical Surface Data)

1st surface:

$\kappa = 1.0000$  $C_2 = 0$
$C_4 = -8.20000 \times 10^{-5}$  $C_6 = -4.16140 \times 10^{-7}$
$C_8 = 2.16270 \times 10^{-8}$  $C_{10} = -4.19800 \times 10^{-10}$ 2nd surface:

$\kappa = 1.0000$  $C_2 = 0$
$C_4 = 7.85750 \times 10^{-5}$  $C_6 = -7.81210 \times 10^{-7}$
$C_8 = 1.31650 \times 10^{-8}$  $C_{10} = -9.45250 \times 10^{-11}$ 3rd surface:

$\kappa = 1.0000$  $C_2 = 0$
$C_4 = 4.69960 \times 10^{-5}$  $C_6 = -6.19500 \times 10^{-7}$
$C_8 = 3.26620 \times 10^{-9}$  $C_{10} = -2.05310 \times 10^{-11}$ 6th surface:

$\kappa = 1.0000$  $C_2 = 0$
$C_4 = 1.75670 \times 10^{-9}$  $C_6 = -2.40560 \times 10^{-11}$
$C_8 = 3.44950 \times 10^{-13}$  $C_{10} = -2.22770 \times 10^{-15}$ (Values Corresponding to Conditions)

Figure 5:
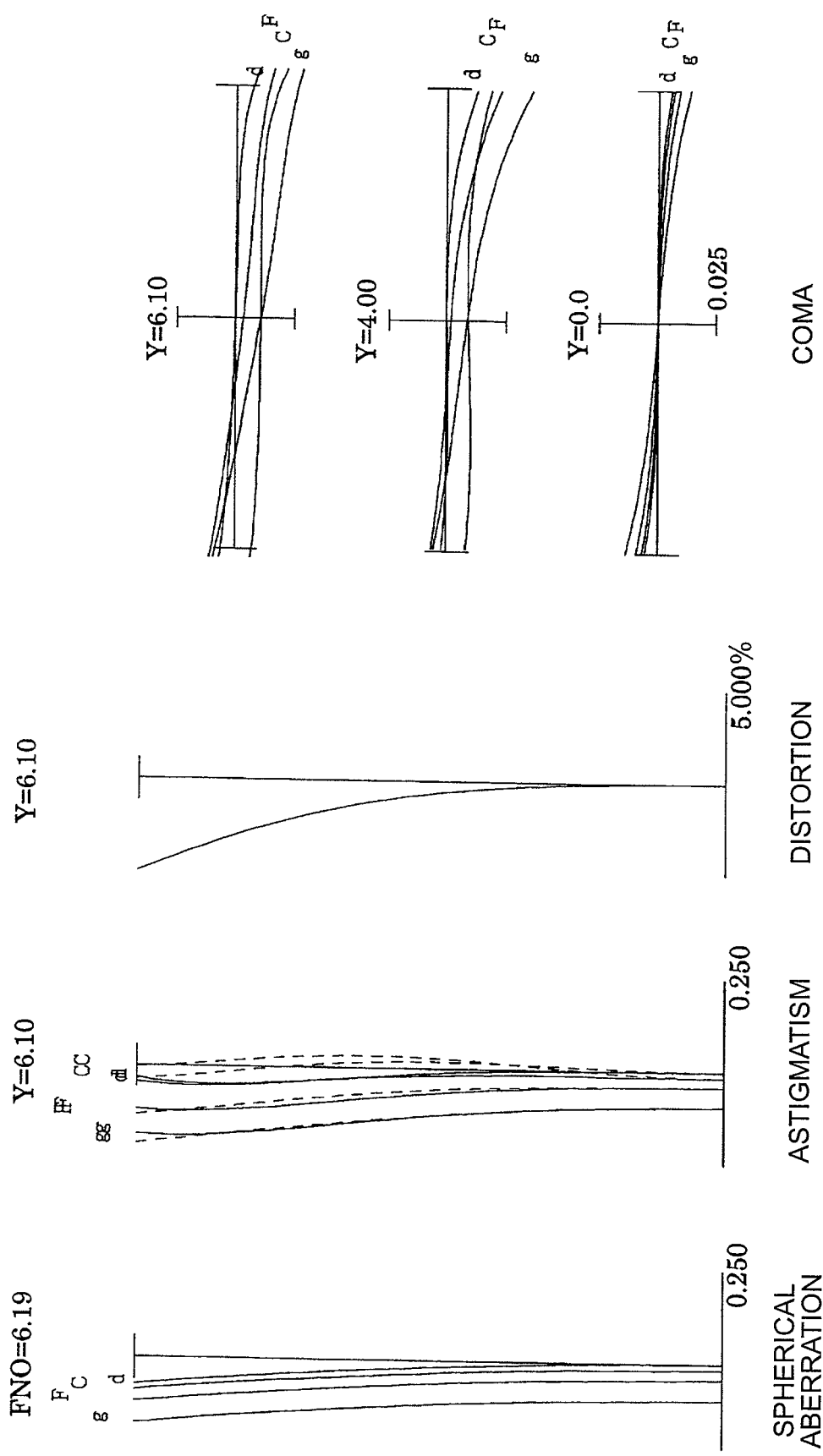
FIG. 5 is a drawing showing spherical aberration, astigmatism, distortion, and coma in the eyepiece optical system of the second example.

$\Delta N_d = 0.038$
$\Delta N_F = 0.0358$
$\Delta N_C = 0.0392$
$E_g = 0.944$
$E_C = 0.965$
$E_d = 0.997$
$\Delta(N_F - N_C) = -0.0034$
$\phi = 17.84$
$f = 18.583$
$h = 0.015$
$D = 0.2$
$PS = 0.01063$
$H = 3.0$
$R = 18.9$
$\Delta W = 0.09592$ (1) $\Delta N_d = 0.038$
(2) $\Delta N_F - \Delta N_C = -0.0034$
(3) $(E_g + E_C)/(2 \times E_d) = 0.957$
(4) $\Delta N_d/\Delta(N_F - N_C) = -11.176$
(5) $\phi/f = 0.96002$
(6) $h/D = 0.075$
(7) $PS/f = 0.00057$
(8) $H \times R/f^2 = 0.164$
(9) $\Delta W/f = 0.00516$
(10) $(E_g + E_d + E_C) \times f/\Delta W = 562.992$ FIG. 5 is a drawing showing the spherical aberration, astigmatism, distortion, and coma in the eyepiece optical system of the second example. As apparent from the aberration diagrams in FIG. 5, it is seen that while the eyepiece optical system of the second example, similar to the first example, is downsized and lightweight, it is also well corrected for the various aberrations including the chromatic aberration over the wide wavelength range from the g line to the C line and excellent optical performance is ensured. The flatness of field is better in the second example than in the first example.

THIRD EXAMPLE

Figure 6:
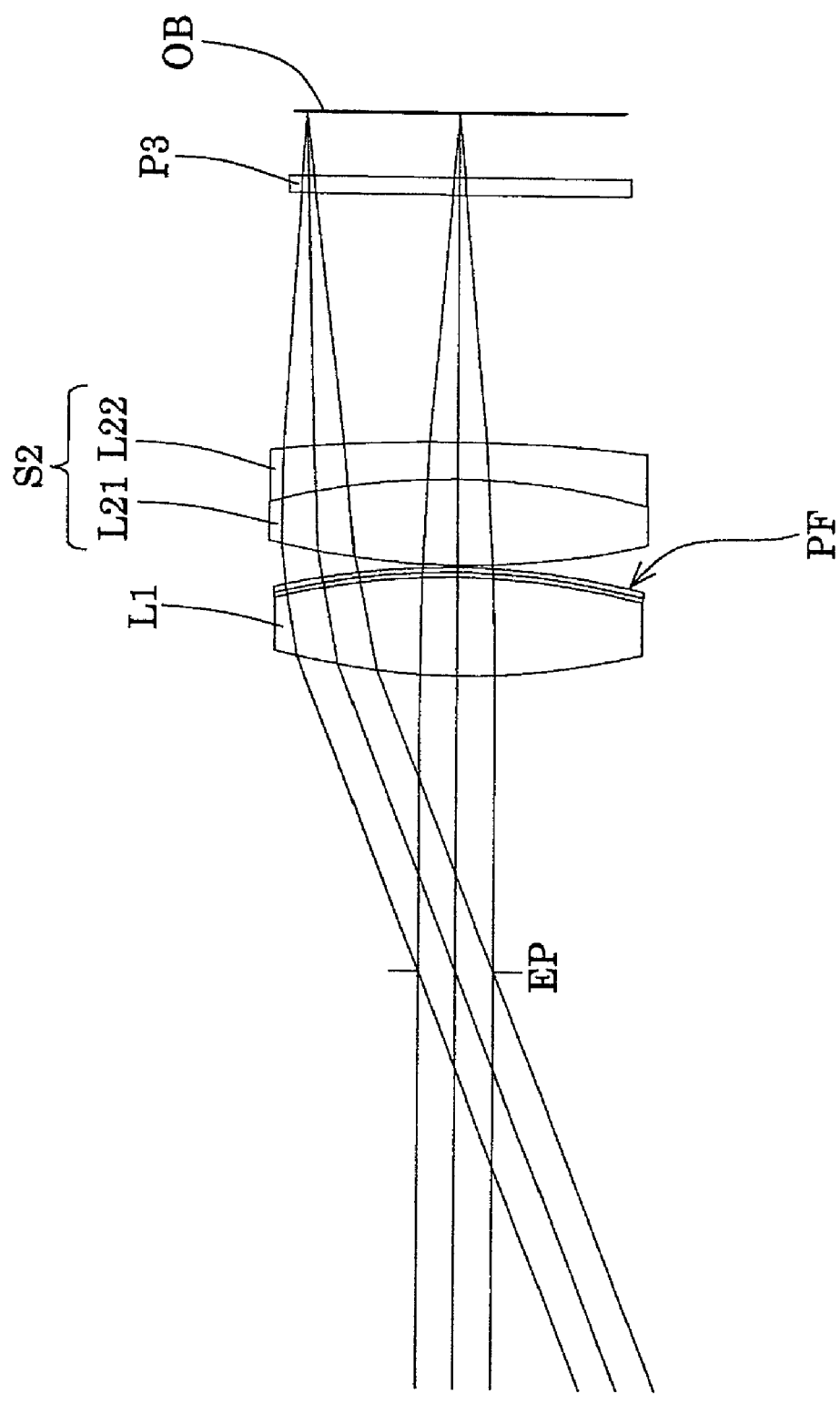
FIG. 6 is a drawing schematically showing a configuration of an eyepiece optical system according to a third example.

FIG. 6 is a drawing schematically showing a configuration of an eyepiece optical system according to the third example.

With reference to FIG. 6, the eyepiece optical system according to the third example is composed of the following elements in order from the eye point side (observer eye side): a biconvex lens L1 with a convex surface of an aspherical shape on the eye point side; a cemented lens S2 consisting of a biconvex lens L21 and a negative meniscus lens L22 with a concave surface on the eye point side; and a plane-parallel plate P3 as a cover glass. A contact multilayered diffractive optical element PF is incorporated so as to be in contact with the surface of the biconvex lens L1 on the observed object side. The exit surface of the diffractive optical element PF (the exit surface of the second diffractive optical member arranged on the exit side of light) is a convex surface of an aspherical shape on the observed object side. The overall field angle of this eyepiece optical system is 42.2°.

Table (3) below provides values of specifications of the eyepiece optical system according to the third example. In the third example, the second surface in the specifications of the optical members in Table (3) corresponds to the entrance surface of the diffractive optical element PF (the entrance surface of the first diffractive optical member arranged on the entrance side of light) and the sixth surface to the entrance surface of the biconvex lens L21. The refractive index data of the third surface and the aspherical surface data of the fourth surface express the optical properties of the diffractive optical surfaces of the contact multilayered diffractive optical element PF.

TABLE (3)

Principal Specifications f = 16.999
R = 12.0

Specifications of Optical Members    SN: Surface number

| SN | r | d | n(d) | n(g) | n(C) | n(F) | Optical member |
|---|---|---|---|---|---|---|---|
|   | (EP) | 15.00000 |  |  |  |  |  |
| 1* | 28.79601 | 4.00000 | 1.524700 | 1.536490 | 1.521960 | 1.531290 | (L1) |
| 2 | −28.78899 | 0.20000 | 1.518900 | 1.538000 | 1.514400 | 1.528900 | (PF) |
| 3 | −28.78899 | 0.00000 | A | B | C | D |  |
| 4* | −28.78899 | 0.20000 | 1.556900 | 1.570900 | 1.553600 | 1.564700 |  |
| 5* | −28.78899 | 0.10000 |  |  |  |  |  |
| 6 | 32.00000 | 3.50000 | 1.533040 | 1.545110 | 1.530346 | 1.539810 | (L21) |
| 7 | −28.00000 | 1.50000 | 1.614200 | 1.646300 | 1.607400 | 1.631400 | (L22) |
| 8 | −68.00000 | 10.00000 |  |  |  |  |  |
| 9 | ∞ | 0.70000 | 1.522160 | 1.533190 | 1.519460 | 1.528340 | (P3) |
| 10 | ∞ | 2.65199 |  |  |  |  |  |

$A = 0.100010000 \times 10^5$,
$B = 0.741868530 \times 10^4$
$C = 0.111704255 \times 10^5$,
$D = 0.827473110 \times 10^4$ (Aspherical Surface Data)

1st surface:

$\kappa = -3.0000$
$C_4 = 4.75000 \times 10^{-5}$
$C_8 = 1.36500 \times 10^{-8}$
$C_2 = 0$
$C_6 = -1.24690 \times 10^{-6}$
$C_{10} = -6.23160 \times 10^{-11}$ 4th surface:

$\kappa = 1.0000$
$C_4 = -1.00000 \times 10^{-9}$
$C_8 = -5.33850 \times 10^{-13}$
$C_2 = 1.60000 \times 10^{-7}$
$C_6 = 4.37060 \times 10^{-11}$
$C_{10} = 2.28480 \times 10^{-15}$ 5th surface:

$\kappa = -9.3788$
$C_4 = -7.74480 \times 10^{-6}$
$C_8 = 5.51070 \times 10^{-9}$
$C_2 = 0$
$C_6 = -5.16060 \times 10^{-7}$
$C_{10} = -2.62390 \times 10^{-11}$ (Values Corresponding to Conditions)

$\Delta N_d = 0.038$
$\Delta N_F = 0.0358$
$\Delta N_C = 0.0392$
$E_g = 0.944$
$E_C = 0.965$
$E_d = 0.997$
$\Delta(N_F - N_C) = -0.0034$
$\phi = 13.6$
$f = 16.999$
$h = 0.015$
$D = 0.2$
$PS = 0.03919$
$H = 3.0$
$R = 12.0$
$\Delta W = 0.04277$
(1) $\Delta N_d = 0.038$
(2) $\Delta N_F - \Delta N_C = -0.0034$
(3) $(E_g + E_C)/(2 \times E_d) = 0.957$
(4) $\Delta N_d/\Delta(N_F - N_C) = -11.176$
(5) $\phi/f = 0.8000$
(6) $h/D = 0.075$
(7) $PS/f = 0.00231$
(8) $H \times R/f^2 = 0.125$
(9) $\Delta W/f = 0.00252$
(10) $(E_g + E_d + E_C) \times f/\Delta W = 1154.994$ FIG. 7 is a drawing showing the spherical aberration, astigmatism, distortion, and coma in the eyepiece optical system of the third example. As apparent from the aberration diagrams in FIG. 7, it is seen that while the eyepiece optical system of the third example, similar to the first example and the second example, is downsized and lightweight, it is well corrected for the various aberrations including the chromatic aberration over the wide wavelength range from the g line to the C line and excellent optical performance is ensured. In the third example, the part of the lens group L1-L22 is thinner than in the first example and the second example.

In each of the foregoing examples, as described above, since the contact multilayered diffractive optical element PF satisfying the required condition is incorporated in the eyepiece optical system, the chromatic aberration is also well corrected over the wide wavelength range from the g line to the C line and the satisfactorily high diffraction efficiencies are ensured by the action of the multilayered diffractive optical element PF. Namely, each example realizes the downsized and lightweight, compact, and high-performance eyepiece optical system. In each example, the diffractive optical element PF can be formed, for example, of UV curing resin and resin molding is performed with a die, which facilitates processing and manufacture and reduces cost.

In each of the above-described examples the contact multilayered diffractive optical element PF is incorporated in the eyepiece optical system, but, without having to be limited to this, the same effect can also be achieved by incorporating the separate multilayered diffractive optical element. Each of the above examples is the application of the embodiment of the present invention to the eyepiece optical system, but, without having to be limited to this, the embodiment of the present invention can also be applied to viewing optical systems other than the eyepiece optical systems, projection optical systems for projecting an image of a display device located at the position of the observed object in each example, onto a screen, and general diffractive optical systems provided with a positive lens and a cemented lens. The diffractive optical system according to each example may also be used in an optical system for forming and viewing an image of a picture on a liquid crystal display device.

In each of the above examples, the units of lengths such as the focal length, eye relief, radius of curvature, and center thickness (axial spacing) in the specifications are generally the unit of "mm." It is, however, noted that the units of the lengths do not always have to be limited to "mm" because the same optical performance is achieved even in proportionally enlarged or proportionally reduced optical systems.

The optical system according to the embodiments according to the present invention comprises the diffractive optical element of the contact multilayered type or separate multilayered type satisfying the required condition. As a result, the optical system is realized as a downsized, lightweight, compact, and high-performance system well corrected for chromatic aberration over a wide wavelength range and securing sufficiently high diffraction efficiencies. In other words, the present invention realizes the diffractive optical system being downsized and lightweight and having excellent optical performance, by the action of the multilayered diffractive optical element.

It should be noted that the embodiments given above were described for facilitating the understanding of the present invention but not for limiting the present invention. Therefore, the elements disclosed in the above embodiments are intended to embrace all design changes and equivalents belonging to the technical scope of the present invention.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all components disclosed in the embodiments. Further, components in different embodiments may be appropriately combined.

What is claimed is:

1. A diffractive optical system comprising a diffractive optical element, the diffractive optical system comprising, in sequence from a side opposite to an object side:
    a first lens component having a first positive lens, and a second lens component having a second positive lens and a negative lens,
    wherein the diffractive optical element comprises a first diffractive optical member having a first diffractive optical surface, and a second diffractive optical member having a second diffractive optical surface,
    wherein the first diffractive optical member and the second diffractive optical member are arranged so that the first diffractive optical surface and the second diffractive optical surface are opposed to each other, and
    wherein a refractive index of the first diffractive optical member and a refractive index of the second diffractive optical member at the d line are different from each other,
    wherein the first diffractive optical surface and the second diffractive optical surface are arranged so as to be in contact with each other, and
    wherein the following condition is satisfied:

$$-15 < \Delta N_d / \Delta (N_F - N_C) < -2,$$

where $\Delta N_d$ is a refractive index difference between the first diffractive optical member and the second diffractive optical member at the d line and $\Delta(N_F - N_C)$ a difference between primary dispersions $(N_F - N_C)$ of the first diffractive optical member and the second diffractive optical member.

2. The diffractive optical system according to claim 1, wherein one diffractive optical member out of the first diffractive optical member and the second diffractive optical member is made of an optical material having a relatively high refractive index and low dispersion and the other diffractive optical member is made of an optical material having a relatively low refractive index and high dispersion, and
    wherein the following condition is satisfied:

$$\Delta N_F - \Delta N_C < 0,$$

where $\Delta N_C$ is a refractive index difference between the first diffractive optical member and the second diffractive optical member at the C line and $\Delta N_F$ a refractive index difference between the first diffractive optical member and the second diffractive optical member at the F line.

3. The diffractive optical system according to claim 1, satisfying the following condition:

$$(E_g + E_C)/(2 \times E_d) > 0.8,$$

where $E_d$ is a diffraction efficiency of the diffractive optical element at the d line, $E_g$ a diffraction efficiency of the diffractive optical element at the g line, and $E_C$ a diffraction efficiency of the diffractive optical element at the C line.

4. The diffractive optical system according to claim 1, wherein the diffractive optical element having the diffractive optical surfaces where a maximum angle of incidence of principal rays is not more than 10° is arranged so as to be in contact with any one optical surface out of an optical surface of the first positive lens, an optical surface of the second positive lens, and an optical surface of the negative lens.

5. The diffractive optical system according to claim 1, satisfying the following condition:

$$0.1 < \phi/f < 3.0,$$

where $\phi$ is an effective diameter (diameter) of the diffractive optical surface and f a focal length of the diffractive optical system.

6. The diffractive optical system according to claim 1, wherein the first diffractive optical surface and the second diffractive optical surface are arranged so as to be in contact with each other, and
wherein the following condition is satisfied:

$$0.05 < h/D < 2.0,$$

where h is a grating height of the first diffractive optical surface and the second diffractive optical surface and D a smaller thickness out of a thickness along the optical axis of the first diffractive optical member and a thickness along the optical axis of the second diffractive optical member.

7. The diffractive optical system according to claim 1, wherein the diffractive optical element is arranged so as to be in contact with either one optical surface out of an optical surface of the first positive lens and an optical surface of the second positive lens.

8. The diffractive optical system according to claim 1, wherein wall surfaces of gratings of the first diffractive optical surface and the second diffractive optical surface are formed with an inclination relative to the optical axis so as to correspond to an inclination relative to a direction of incident rays.

9. The diffractive optical system according to claim 1, wherein a refractive index difference $\Delta N_d$ between the first diffractive optical member and the second diffractive optical member at the d line satisfies the following condition:

$$0.005 < \Delta N_d < 0.45.$$

10. An eyepiece optical system for viewing an image of an object, the eyepiece optical system comprising the diffractive optical system as defined in claim 1.

11. A diffractive optical system comprising a diffractive optical element, the diffractive optical system comprising, in sequence from a side opposite to an object side:
a first lens component having a first positive lens, and a second lens component having a second positive lens and a negative lens,
wherein the diffractive optical element comprises a first diffractive optical member having a first diffractive optical surface, and a second diffractive optical member having a second diffractive optical surface,
wherein the first diffractive optical member and the second diffractive optical member are arranged so that the first diffractive optical surface and the second diffractive optical surface are opposed to each other,
wherein a refractive index of the first diffractive optical member and a refractive index of the second diffractive optical member at the d line are different from each other,
wherein the second lens component is a cemented lens,
wherein a joint surface of the cemented lens is a convex surface on the first positive lens side,
wherein the diffractive optical element is incorporated in the joint surface of the cemented lens, and
wherein the following condition is satisfied:

$$0.0002 < PS/f < 0.01,$$

where PS is a Petzval sum of the diffractive optical system and f a focal length of the diffractive optical system.

* * * * *